(12) United States Patent
Wu

(10) Patent No.: US 7,200,570 B1
(45) Date of Patent: Apr. 3, 2007

(54) MULTI-ATTRIBUTE AUCTION METHODOLOGY AND SYSTEM

(75) Inventor: Frederick Yung-Fung Wu, Cos Cob, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/545,568

(22) Filed: Apr. 7, 2000

(51) Int. Cl.
*G06Q 40/00* (2006.01)

(52) U.S. Cl. .............................. 705/37; 705/26; 705/61
(58) Field of Classification Search ................. 705/37, 705/80, 412, 1, 27
See application file for complete search history.

(56) References Cited

U.S. PATENT DOCUMENTS

| | | | |
|---|---|---|---|
| 5,592,375 A | | 1/1997 | Salmon et al. |
| 5,715,402 A | * | 2/1998 | Popolo ........................ 705/37 |
| 5,794,207 A | | 8/1998 | Walker et al. ................. 705/23 |
| 5,950,172 A | | 9/1999 | Klingman |
| 6,012,046 A | * | 1/2000 | Lupien et al. ................. 705/35 |
| 6,038,554 A | | 3/2000 | Vig .............................. 705/400 |
| 6,047,274 A | * | 4/2000 | Johnson et al. ............... 705/10 |
| 6,058,379 A | * | 5/2000 | Odom et al. .................. 705/37 |
| 6,061,660 A | | 5/2000 | Eggleston et al. |
| 6,141,653 A | | 10/2000 | Conklin et al. |
| 6,151,589 A | * | 11/2000 | Aggarwal et al. ............. 705/1 |
| 6,236,972 B1 | | 5/2001 | Shkedy |
| 6,236,977 B1 | | 5/2001 | Verba et al. |
| 6,243,691 B1 | * | 6/2001 | Fisher et al. .................. 705/37 |
| 6,338,050 B1 | * | 1/2002 | Conklin et al. ............... 705/80 |
| 6,341,270 B1 | | 1/2002 | Esposito et al. |
| 6,647,373 B1 | * | 11/2003 | Carlton-Foss ................ 705/37 |

FOREIGN PATENT DOCUMENTS

| | | | |
|---|---|---|---|
| GB | 2366885 A | * | 3/2002 |
| WO | WO 01/44976 | | 6/2001 |
| WO | WO 01/48656 | | 7/2001 |
| WO | WO 01/53929 | | 7/2001 |
| WO | WO 01/63525 | | 8/2001 |
| WO | WO 01/69506 | | 9/2001 |
| WO | WO 01/75740 | | 10/2001 |

(Continued)

OTHER PUBLICATIONS

Sardine: Dynamic Seller Strategies in an Auction Marketplace, Joan Morris, Peter Ree, Pattie Maes, MIT Media Lab, Cambridge, MA.*

(Continued)

*Primary Examiner*—Frantzy Poinvil
*Assistant Examiner*—Harish T. Dass
(74) *Attorney, Agent, or Firm*—Whitham, Curtis, Christofferson & Cook, P.C.; Stephen C. Kaufman

(57) ABSTRACT

A way to conduct complex transactions by auction efficiently and with a high degree of automation is provided by a methodology for conducting auctions in which bids contain multiple attributes, as opposed to a single attribute (price). Bidders are requested to specify values for each of a set of attributes, which can include transaction terms as well as product and/or service specifications. The bids are evaluated according to criteria that are functions of these attributes in order to reject losing bids and assist the auctioneer in selecting the winning bid(s).

20 Claims, 3 Drawing Sheets

FOREIGN PATENT DOCUMENTS

WO     WO 01/75756     10/2001

OTHER PUBLICATIONS

Genesove, David "Search at wholesale auto auctions", Quarterly Journal of Economics, v110, n1, p. 23(27) Feb. 1995.*

Bichler et al "Simulation of multidimensional procurement auctions", Publication Date: 2000 Country of Publication: USA xxiv+824 pp. ISBN: 1 56555 204 0.*

Hogan, William W "An Efficient Concurrent Auction Model for Firm Natural Gas Transportation Capacity" INFOR. Ottawa: Aug. 1992. vol. 30, Iss. 3; p. 240, 17 pgs.*

Li, Susan Xiaotian "Optimal Decision-Making in Restricted Markets (Buyer Seller Transactions)", 1992, vol. 53/08-A Of Dissertation Abstracts International; Corporate Source/Institution: The University Of Texas At Austin.*

G. Agrawal et al.. "Imtuitive Visualixation of Pareto Frontier for Multi-Objective Optimization in n-Dimensional Performance Space" Proceedings of the 10th AIAA/ISAMO Multidisciplinary Analysisi and Optimization Conference; Sep. 2004.

Marek Kisiel-Dorohinicki, "Applying Mechanism oF Crowd in Evolutionary MAS for Multiobjective Optimization" Presented ath the KAEiOG 2001 Conference; May 30-Jun. 1, 2001.

* cited by examiner

MULTI-ATTRIBUTE AUCTION METHODOLOGY AND SYSTEM

BACKGROUND OF THE INVENTION

1. Field of the Invention

The present invention generally relates to on-line electronic commerce (e-commerce) and, more particularly, to a methodology and software system for buying and selling products and services based on multiple characteristics. The invention is an extension of traditional auction methodologies and can be applied to automated electronic auctions, such as those on the Internet.

2. Background Description

Auctions have been used as a means of buying and selling goods for centuries. They are recommended as a way for buyers and sellers to conduct a transaction when the fair market value of the goods or services is not well known. Many types of auctions have been invented, analyzed, and used. The literature indicates that there is no single best design for an auction; instead, good design of an auction depends strongly on the goods/services on auction, the size of the market (number of potential bidders), and the characteristics of the bidders.

An auction can be a seller's auction, in which a single entity (person or company) is selling, and multiple entities are bidding to purchase. Alternatively, an auction can be a buyer's auction, in which there is a single buyer and multiple sellers bid. And finally, an auction can be two-sided, with multiple buyers and sellers active simultaneously. The discussion that follows can be applied to all these types of auctions. However, for the sake of concreteness we will consider the case of a seller's auction. Furthermore, we will use the term "goods" to mean products and/or services.

In a typical auction, the characteristics of the goods involved are well-defined. For example, at an antiques auction, the items on sale are often physically in the auction room, and bidders can see and touch them or read a description of them to learn of their attributes. These attributes cannot be changed. The items are immediately available. The only unknown is their value. Therefore, each bidder need specify only the amount he is willing to pay, and the highest bid wins. In other situations that are more typical of business transactions, especially among manufacturing supply chain entities, the value (or price) is not the only mutable attribute of the goods. For example, consider a manufacturer selling a newly completed product. One of the most important terms of sale will be the delivery date (and the closely linked payment date). Of two buyers offering the same price, one willing to take immediate delivery and the other wishing delivery next year, the manufacturer will clearly prefer the buyer that wants immediate delivery, because it reduces inventory costs and improves cash flow. Similarly, suppose the manufacturer is scheduled to complete the product in two weeks. He receives one bid for delivery in one week, and another for delivery in three weeks, both at the same price. In order to choose between these bids, the manufacturer must compare the cost of accelerating the production schedule by one week versus holding inventory for an additional week. The point is that price is by no means the only important variable that an auction should resolve.

The previous examples demonstrated that, in addition to price, delivery time is an important parameter in a transaction. In fact, depending on the domain of interest, there is any number of important transaction characteristics that could be varied and that would affect the seller's choice of the winning bid. As an example, consider a manufacturer of steel who is selling a production run by auction. In the production run, the manufacturer can produce grades of steel with different physical characteristics, such as hardness. However, the cost of the raw materials for different grades may not be the same. Consequently, selecting the best bid will depend not only on the bid price, but also on the grade of steel specified with the bid.

In the examples given above, the additional transaction attributes (delivery date and steel grade) affected the cost of the transaction, and could therefore be translated into a monetary value for comparison with the bid prices. If this were true in general, then selecting the winning bid would always be simply a process of evaluating the cost factors associated with all the bids' attributes, modifying the bid prices according to these cost factors, and choosing the bid with the highest modified price. However, there are transaction attributes which cannot be completely characterized in monetary terms. Continuing the example of the manufacturer that plans to complete making a product in two weeks, suppose that changing the production schedule to deliver in one week requires delaying an important customer order by a week. In addition to possible money costs resulting from the late delivery, the manufacturer incurs a difficult-to-quantify liability arising from a customer satisfaction problem. More generally, there are transaction characteristics which cannot be adequately expressed as monetary factors. This fact implies that there may not always be a single "best" bid in a multi-attribute auction.

SUMMARY OF THE INVENTION

It is therefore an object of the present invention to provide a way to conduct complex transactions by auction efficiently and with a high degree of automation.

According to the invention, there is provided a methodology for conducting auctions in which bids contain multiple attributes, as opposed to a single attribute (price). Bidders are requested to specify values for each of a set of attributes, which can include transaction terms as well as product and/or service specifications. The bids are evaluated according to criteria that are functions of these attributes in order to determine the winning bid(s).

In the simple case, all the attributes of a bid can be converted into a monetary value and then combined to form an effective bid price. The bid with the highest (or lowest) effective bid price wins.

In the more complex case, no single criterion is sufficient to capture all the important implications of every attribute value. In this case, there is at least one additional dimension other than effective bid price by which each bid must be evaluated. Consequently, the bid evaluation space is multi-dimensional, and to select the winning bid(s) the auctioneer must trade off possibly conflicting objectives using knowledge that has not been encoded in the evaluations.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
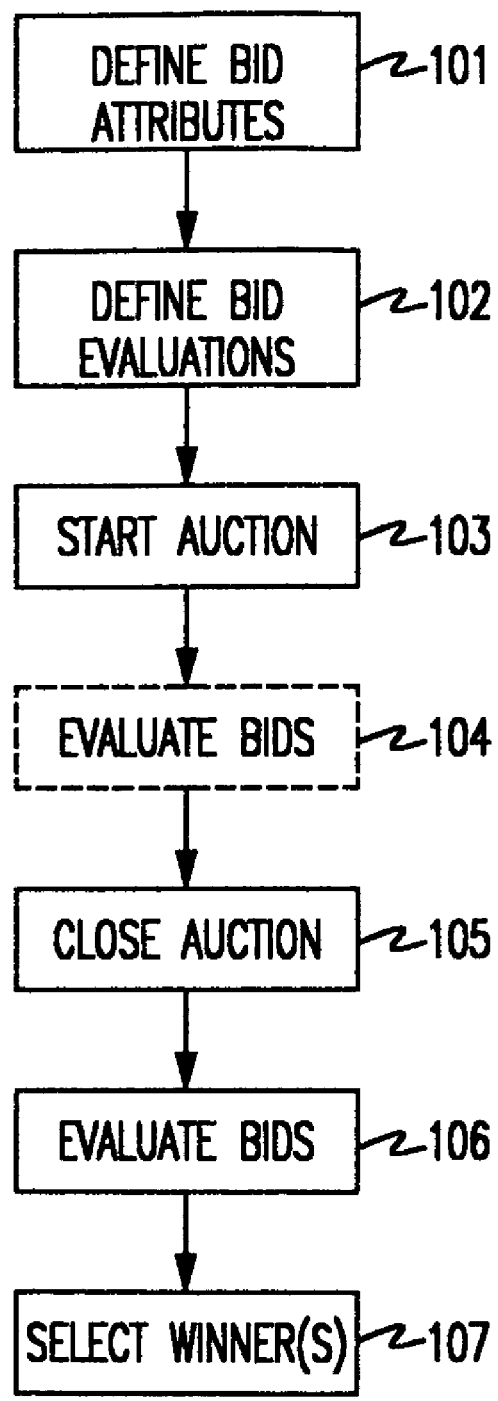
FIG. 1 is a flow diagram illustrating the over all process of the auction model according to the invention.

The invention includes a software system that conducts the auction and performs the bid evaluation. We assume here an "open cry" auction mode, in which each bidder can view all the bids, but the system can be designed to operate with other models as well. We refer to the entity that is selling the goods in a seller's auction (or buying the goods in a buyer's auction) as the "the auctioneer". We refer to the entity that administers the auction as the administrator. The auctioneer has responsibility for selecting the winning bid(s). With reference to FIG. 1, the auctioneer first defines the bid attributes in function block 101 and the conversion functions from bid attributes into evaluation criteria in function block 102. The system initiates the auction in function block 103, optionally evaluating bids as they are received in function block 104, and accepting bids until the conditions for closing the auction are met in function block 105. At this point, the system evaluates the bids in function block 106. Winners are selected in function block 107. In the simple case, the system can automatically determine the winning bid(s), simply by selecting those with the highest (or lowest) effective bid price. In the complex case, the system eliminates all the non-dominated bids (those that are not worse than any other bid by every criterion) and displays them to the auctioneer. The auctioneer manually selects the winner(s) from this set.

Figure 2:
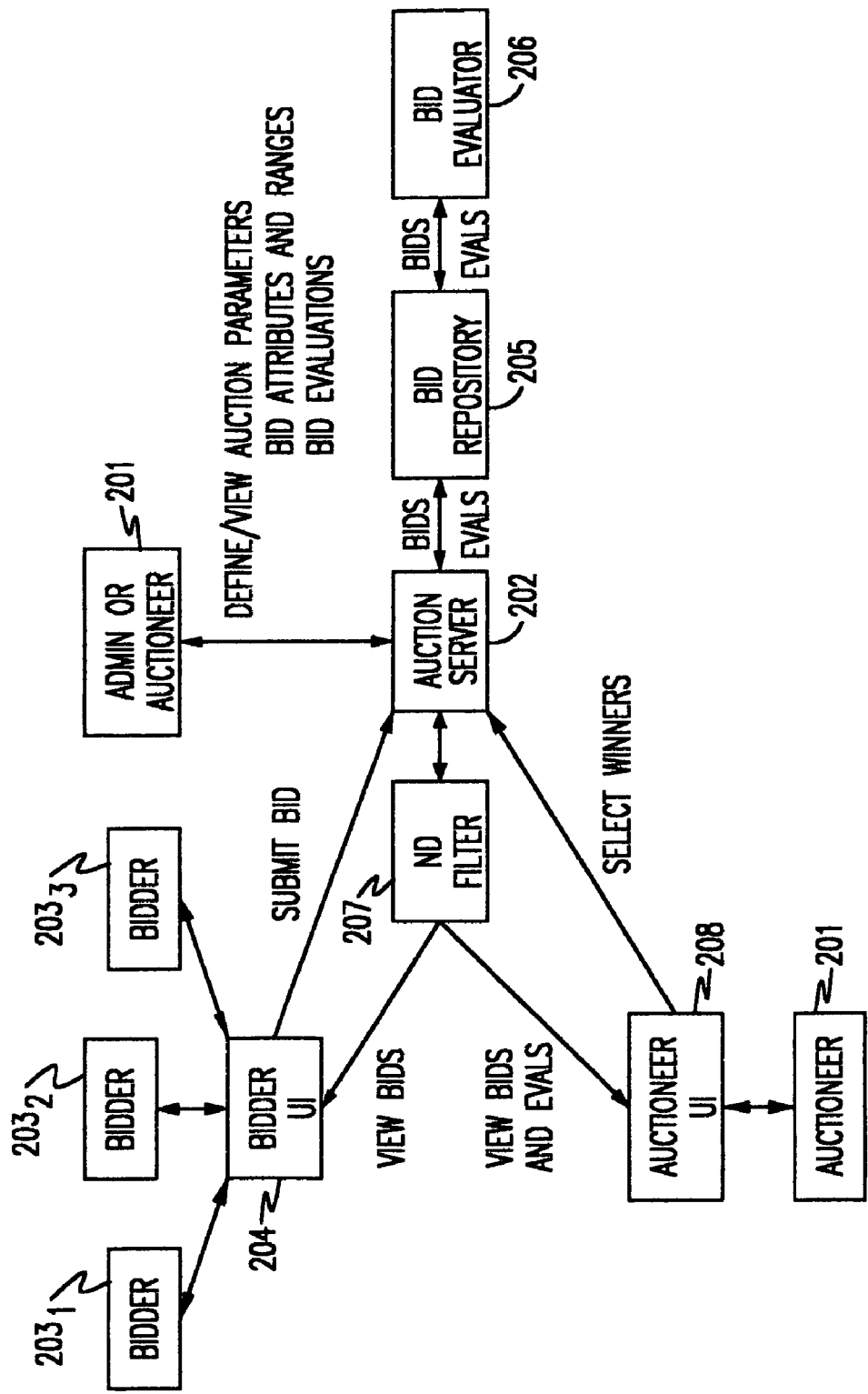
FIG. 2 is a block diagram showing a system on which the auction process according to a preferred embodiment of the invention may be implemented.

In the preferred embodiment shown in FIG. 2, the auctioneer 201 (or the administrator) first defines all the parameters of the auction. Note that the functions of auctioneer and administrator can be split. The definition of parameters by the auctioneer 201 (or the administrator) are entered into an auction server 202. These parameters include some traditional ones, such as the starting time, the ending time, and the visibility of the bids. They also include a complete definition of the item being auctioned, which may be characterized by the values of a set of attributes. Some of these attributes may be attributes of the product or service; others may be attributes of the transaction, or terms and conditions of the deal. The latter could include price, quantity, delivery date, payment terms, or warranty terms.

Unlike a traditional auction in which only the price is open to negotiation, the auctioneer chooses the subset of the attributes that are to be negotiable: $A_1, A_2, \ldots, A_n$. The auctioneer 201 (or the administrator) can limit the acceptable values of any attribute. In the case of attributes which have discrete values, the auctioneer can limit the values to a predetermined set. In the case of attributes that can take on any value in a continuous range, the auctioneer can limit values to a discrete set of values or to one or more ranges of values, or both.

By limiting the allowable values of the attributes, the auctioneer prompts bidders $203_1$, $203_2$, $203_3$ to propose transactions that the auctioneer might actually consider. Next the auctioneer 201 defines the means of evaluating bids. The auctioneer can define a single evaluation that takes into account all negotiable attributes as $E=f(v_1, v_2, \ldots, v_n)$, where $v_k$ is a bid value for attribute $A_k$. Alternatively, the auctioneer can define multiple evaluations $E_1, E_2, \ldots, E_m$, where each $E_i$ is a function of the values of some subset of the negotiable attributes. The auctioneer's choice of a single or multiple independent evaluations affects the ability of the auction system to identify winning bids automatically. If a single evaluation is defined, then bids can be compared according to that evaluation and a winning bid determined. However, if multiple independent evaluations are defined for the auction, then in general there will not be a single best bid.

The bidders $203_1$, $203_2$, $203_3$ communicate their bids to the auction server 202 via a bidder user interface (UI) 204. The received bids are stored in a bid repository 205 by the auction server 202, and this bid repository is accessed by a bid evaluator 206. The bid repository 205 is a standard database, and the bid evaluator 206 is a processor which computes the evaluation(s) of each of the bids based on the defined evaluation functions.

During the auction, the auction server 202 receives information on the current bids and evaluations from the bid repository 205 and the bid evaluator 206, and this information is passed through a non-dominated filter 207 to display bids to the bidders via the bidder UI 204. The auctioneer 201 views the bids and current evaluations via the auctioneer UI 208.

Bid evaluation is conducted either continuously as bids are received or only at the close of the auction. Continuous evaluation of bids is needed if the auction parameters require the display of leading bids (to either the bidders or the auctioneer) or if they require immediate rejection of valid bids that are dominated (and therefore would not be accepted). If there is only one evaluation, then determination of the leading bid(s) is straightforward and automatic. The leading bid(s) are those with the highest evaluation. At auction closing, the leading bids are the winners.

If multiple independent evaluations have been defined, then the system evaluates each bid as it is received, and determines whether it is dominated. If it is dominated, then the bid is rejected. If it is non-dominated, it is added to the set of non-dominated bids. If it dominates a bid that was previously non-dominated, then the newly dominated bid is rejected. At the close of the auction, the system cannot determine the actual winning bids. Instead, all the non-dominated bids are presented to the auctioneer, along with their evaluations and attribute values. The auctioneer can then select the winning bid(s) from the non-dominated set by weighing the relative importance of the bid attributes and the corresponding evaluations, and making tradeoffs between them.

If the auction does not require continuous bid evaluation, then evaluation is done only at closing. If there is only one evaluation defined, then determination of the winning bid(s) is automatic. If there are multiple evaluations, then determination of the winning bid(s) is not automatic; however, all dominated bids can be automatically rejected. The non-dominated bids are presented to the auctioneer, along with their evaluations and attribute values. The auctioneer can then select the winning bids from the non-dominated set by weighing the relative importance of the bid attributes and the corresponding evaluations, and making tradeoffs between them.

A complication arises when there are multiple units of an item on auction and a bid can specify less than the full amount available. In this case identification of the non-dominated set of bids for all the items can be performed in the following manner. First find the non-dominated set of bids for the first item. For each of these bids, suppose that the bid is accepted and the quantity of the item in the bid is sold. Then of the remaining bids for the next unit on auction, find the non-dominated set. For each of these bids, suppose that the bid is accepted and the quantity of the item in the bid is sold. Continue this until the last item is accounted for. The set of all bids that might be accepted in this procedure would be considered the non-dominated set for the entire quantity on auction.

Figure 3:
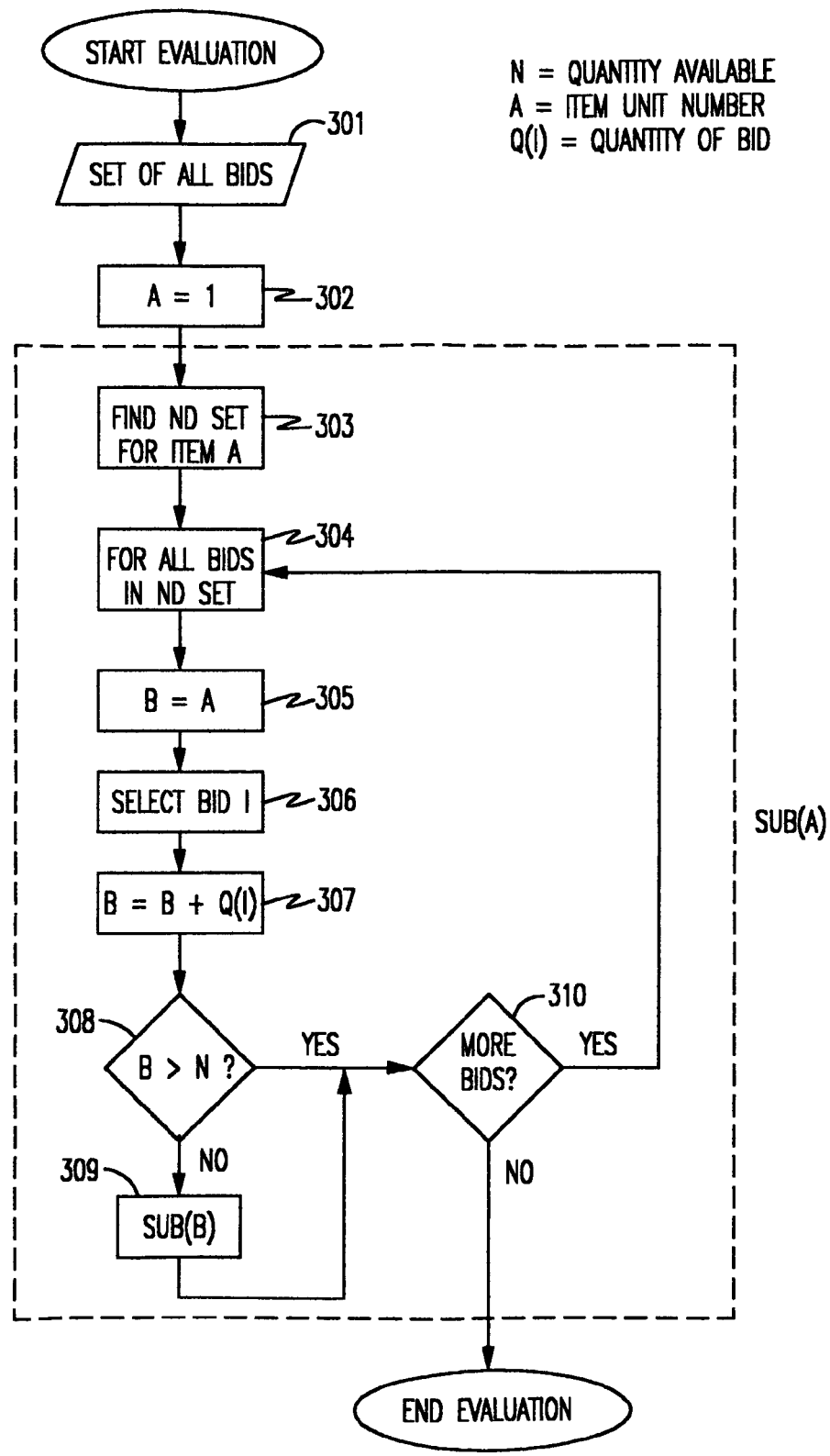
FIG. 3 is a flow diagram showing a possible implementation of the process of finding the non-dominated sets of bids in the system of FIG. 2.

FIG. 3 is a flow diagram showing a possible implementation of the process of finding the non-dominated set of bids in the system of FIG. 2. The dashed rectangle labeled as "sub(a)" is a recursive subroutine. The evaluation begins by accessing the set of all bids at input block 301. The item unit number, a, is set to one in function block 302 before the subroutine is entered. Upon entering the subroutine, the ND set for item a is found in function block 303. Then a loop over all the bids in the ND set is executed. In this loop, an index variable b is set equal to a in function block 305. Bid i is selected in function block 306, and b is set to b+q(i) in function block 307, where q(i) is the quantity of bid i. A test is made in decision block 308 to determine if b is greater than n, the quantity available. If so, then if there are more bids in the ND set, the loop is executed for the next bid. If b is not greater than n, then the recursive subroutine sub( ) is called again, but this time with the input parameter b, the next item to be considered. When there are no more bids in the ND set, the flow exits the recursive subroutine, returning to the current loop at function block 310. When the last iteration of the outermost loop has been done, evaluation is complete.

The process shown in FIG. 3 may be described in pseudo-code as follows:
n=original quantity available
set a=1
find the non-dominated set of bids for the $a^{th}$ item
for each bid i in the non-dominated set of bids for the $a^{th}$ item
   set the item unit number 'b' to the original item unit number 'a'
   assume the bid is accepted
   increment the item unit number 'b' by the quantity of the bid q(i)
   If b>n, go to next bid
   otherwise, find the non-dominated set of bids for the $b^{th}$ item
   for each bid 'j' in the non-dominated set of bids for the $a^{th}$ item
     set the item unit number 'c' to the original item unit number 'b'
     assume the bid is accepted
     increment the item unit number 'c' by the quantity of the bid q(j)
     if c>n, go to the next bid
     otherwise, find the non-dominated set of bids for the $c^{th}$ item
     . . .
     . . .
        continue until quantity remaining reaches zero All bids that could be accepted by following the above procedure are in the non-dominated set of bids for all the items; all others are dominated. If the bids are continuously evaluated, those that are dominated would be immediately rejected, and the bidder notified of the rejection.

In the final step the auctioneer views the set of non-dominated bids for the first unit. These bids can be sorted according to a metric defined by the auction parameters. The purpose of such a metric (for example, a linear combination of the bid evaluations) would be to draw the auctioneer's attention to those bids that are most likely to be selected as the winner for the first units. The auctioneer selects the winning bid for the first unit(s). After the first winning bid is selected, the number of remaining units is decremented by the bid quantity, the bid is removed from the set of non-dominated bids, and the updated set of non-dominated bids for the next unit(s) is displayed. This procedure is repeated until no units remain.

As a concrete example, consider an auction by a personal computer manufacturer offering a set of 100 new Pentium® III computers. For simplicity, assume that bids are evaluated only at the close of the auction. Suppose that the manufacturer has already partially assembled the machines, but can easily modify the amount of memory and the capacity of the hard drive. The manufacturer offers the machines in their default configuration, but specifies that the memory and disk capacity can be modified as follows:
   memory—64 MB (default), 96 MB, or 128 MB
   disk capacity—8 GB (default), 12 GB, or 16 GB Suppose that machines with the default configuration can be delivered in two days, and that bids can specify any delivery greater than or equal to two days. However, a disk drive upgrade normally delays delivery by one day. The manufacturer decides to consider two evaluations of bids. The first evaluation is the profit, and the second is the risk of assembly line problems. He defines the profit evaluation as the selling price minus the default configuration cost ($600) minus the extra cost of the upgrades ($30 for each additional 32 MB of memory, $45 for each additional 4 GB of disk capacity). He defines the assembly risk as 1 for a memory upgrade, 2 for a disk drive upgrade and 2 for each day of accelerated delivery.

Now we consider a set of bids for the computers:
   Bid A: 65 units, 64 MB, 12 GB, 2 days, $950
   Bid B: 40 units, 64 MB, 8 GB, 3 days, $930
   Bid C: 75 units, 128 MB, 16 GB, 3 days, $1180
   Bid D: 60 units, 96 MB, 12 GB, 2 days, $1250
   Bid E: 80 units, 64 MB, 12 GB, 3 days, $850
   Bid F: 85 units, 96 MB, 16 GB, 2 days, $1020
The evaluations of these bids is as follows:
   Bid A: profit $305, risk 4
   Bid B: profit $330, risk 0
   Bid C: profit $430, risk 3
   Bid D: profit $575, risk 5
   Bid E: profit $205, risk 2
   Bid F: profit $300, risk 5

Following the procedure outlined above for finding the non-dominated set, we find first that the non-dominated bids for the first machine are bids B, C, and D. (Bids A, E and F are dominated because they have worse profit and risk scores than bid B.)

First suppose the auctioneer accepts bid B. That leaves 60 units. For the next unit, the non-dominated set of bids is C, D, and E. (Bids A and F are dominated by bid C.)
   Suppose the auctioneer accepts bid C. That reduces the quantity remaining to zero.
   Suppose the auctioneer accepts bid D. That reduces the quantity remaining to zero.
   Suppose the auctioneer accepts bid E. That reduces the quantity remaining to zero.

Next, suppose the auctioneer accepts bid C. That leaves 25 units. For the next unit, the non-dominated set of bids is B and D.
   Suppose the auctioneer accepts bid B. That reduces the quantity remaining to zero.
   Suppose the auctioneer accepts bid D. That reduces the quantity remaining to zero.

Next, suppose the auctioneer accepts bid D. That leaves 40 units. For the next unit, the non-dominated set of bids is B and C.

Suppose the auctioneer accepts bid B. That reduces the quantity remaining to zero.

Suppose the auctioneer accepts bid C. That reduces the quantity remaining to zero.

The non-dominated set for the entire auctioned quantity is all those bids that could possibly be accepted (from the non-dominated set) before the quantity is exhausted. From this we can conclude that the non-dominated set of bids for all items is bids B, C, D, and E.

Since in this example the auctioneer has defined more than one evaluation, the closing of the auction involves manual selection of the winning bids by the auctioneer. The non-dominated set for the first unit, bids B, C, and D are displayed to the auctioneer. The auctioneer might choose bid C as the first winning bid because, at the moment, it is imperative that profits be increased, but the risk associated with bid D is too high. The number of available units is then decreased from 100 to 25. The non-dominated set for the next unit is displayed (bids B and D). For the next and final winning bid, he might choose bid B, again avoiding the high risk of bid D. However, bid B is only partly fulfilled because the requested 40 units are not available. Thus, bid C is a winner, for the full 75 units requested, and bid B is also a winner for 25 units.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for conducting complex transactions by auction efficiently and with a high degree of automation comprising the steps of:

inputting to a computer database a plurality of defined criteria for evaluation of bids for goods being auctioned, each of said criteria being a function of a set of attributes, said set of attributes providing a complete definition of said goods;

identifying in said computer database by an auctioneer of a plurality of attributes as negotiable, each of said plurality of negotiable attributes being within said set of attributes, at least one of said negotiable attributes being other than price or quantity, and each said negotiable attribute being an independent variable in the defining function of at least one of said defined criteria;

receiving by automated means bids from bidders wherein the bids specify values for each of said plurality of negotiable attributes; and evaluating by automated means said bids according to said defined criteria to reject losing bids, to identify bids remaining after losing bids are rejected, said evaluation according to defined criteria allowing for a plurality of remaining bids, and to assist the auctioneer in determining winning bids from said remaining bids, wherein said receiving and evaluating means are able to receive and evaluate bids without human intervention in an auction conducted over the Internet, and wherein the step of evaluating includes the step of rejecting at least one dominated bid, a dominated bid being a bid wherein another bid is superior to the dominated bid on each and every one of said defined criteria the non-rejected set of bids then being presented to the auctioneer along with their corresponding evaluations and attribute values for selection of winning bids by weighing the relative importance of the negotiable bid attributes and corresponding evaluations and making tradeoffs between them.

2. The method for conducting complex transactions by auction as recited in claim 1, wherein the set of attributes comprise default values.

3. The method for conducting complex transactions by auction as recited in claim 1, further comprising the step of defining bid parameters with multiple attributes of the transaction.

4. The method for conducting complex transactions by auction as recited in claim 3, further comprising the step of restricting bid attributes to certain values or ranges of values.

5. The method for conducting complex transactions by auction as recited in claim 1, wherein the step of evaluating further comprises the step of rejecting all dominated bids and selecting a non-dominated set of bids.

6. The method for conducting complex transactions by auction as recited in claim 1, wherein the step of evaluating further comprises the step of sorting bids by a predefined criteria to assist the auctioneer in determining winning bids.

7. The method for conducting complex transactions by auction as recited in claim 1, wherein the defined criteria comprise a single criteria and the selection of a winning bid is automatic based on the single criteria.

8. The method for conducting complex transactions by auction as recited in claim 1, wherein said bid evaluations are made continuously.

9. The method for conducting complex transactions by auction as recited in claim 1, further comprising the step of defining multiple bid evaluations.

10. The method for conducting complex transactions by auction as recited in claim 1, wherein there are multiple units of an item on auction and a bid can specify less than the full amount available.

11. The method for conducting complex transactions by auction as recited in claim 10, further comprising the step of restricting bid attributes to certain values or ranges of values.

12. The method for conducting complex transactions by auction as recited in claim 10, wherein said bid evaluations are made continuously.

13. The method for conducting complex transactions by auction as recited in claim 10, further comprising the step of defining multiple criteria for evaluation of bids.

14. The method for conducting complex transactions by auction as recited in claim 10, further comprising the step of defining bid parameters with multiple attributes of the transaction.

15. The method for conducting complex transactions by auction as recited in claim 14, further comprising the step of restricting bid attributes to certain values or ranges of values.

16. A system for conducting complex transactions by auction efficiently and with a high degree of automation comprising:

means for inputting to a computer database a plurality of defined criteria for evaluation of bids for goods being auctioned, each of said criteria being a function of a set of attributes, said set of attributes providing a complete definition of said goods, a plurality of attributes from said set being designated in said computer database by an auctioneer as negotiable, at least one of said negotiable attributes being other than price or quantity, and each said negotiable attribute being an independent variable in the defining function of at least one of said defined criteria;

automated means for receiving bids from bidders wherein the bids specify values for each of said plurality of negotiable attributes; and automated means for evaluating said bids according to said defined criteria to reject losing bids, to identify bids remaining after losing bids are rejected, said evaluation according to defined criteria allowing for a plurality of remaining bids, and to assist the auctioneer in determining winning bids from said remaining bids, wherein said receiving and evaluating means are able to receive and evaluate bids without human intervention in an auction conducted over the Internet, and wherein said automated means for evaluating includes rejecting at least one dominated bid, a dominated bid being a bid wherein another bid is superior to the dominated bid on each and every one of said defined criteria, the non-rejected set of bids then being presented to the auctioneer along with their corresponding evaluations and attribute values for selection of winning bids by weighing the relative importance of the negotiable bid attributes and corresponding evaluations and making tradeoffs between them.

17. The system for conducing complex transactions by auction as recited in claim 16, wherein the set of attributes comprise default values.

18. The system for conduct complex transactions by auction as recited in claim 16, wherein the automated means for evaluating further comprises automated means for sorting bids by a predefined criteria to assist the auctioneer in determining winning bids.

19. The system for conducting complex transactions by auction as recited in claim 18, further comprising means for restricting bid attributes to certain values or ranges of values.

20. The system for conducting complex transactions by auction as recited in claim 16, wherein the automated means for evaluating further comprises automated means for rejecting all dominated bids and selecting a non-dominated set of bids.

* * * * *